United States Patent
Kokubo et al.

(10) Patent No.: US 7,626,616 B2
(45) Date of Patent: Dec. 1, 2009

(54) AUTOMATIC GAIN CONTROL CIRCUIT WITH EXPOSURE CONTROL CIRCUIT

(75) Inventors: Asao Kokubo, Kawasaki (JP); Hiroshi Daiku, Kawasaki (JP); Yutaka Takeda, Yokohama (JP); Norihiro Yoshida, Yokohama (JP)

(73) Assignee: Fujitsu Microelectronics Limited, Tokyo (JP)

( * ) Notice: Subject to any disclaimer, the term of this patent is extended or adjusted under 35 U.S.C. 154(b) by 374 days.

(21) Appl. No.: 11/488,787

(22) Filed: Jul. 19, 2006

(65) Prior Publication Data

US 2006/0256207 A1 Nov. 16, 2006

Related U.S. Application Data

(63) Continuation of application No. PCT/JP2004/003527, filed on Mar. 17, 2004.

(51) Int. Cl.
H04N 5/235 (2006.01)
H04N 3/14 (2006.01)
H04N 5/335 (2006.01)
H04N 5/238 (2006.01)

(52) U.S. Cl. ............ 348/229.1; 348/362; 348/296

(58) Field of Classification Search ......... 348/229.1, 348/230.1, 362, 363, 364, 296, 297, 367
See application file for complete search history.

(56) References Cited

U.S. PATENT DOCUMENTS

| | | | |
|---|---|---|---|
| 5,982,424 A | 11/1999 | Simerly et al. | |
| 5,986,705 A * | 11/1999 | Shibuya et al. | ......... 348/362 |
| 6,567,123 B1 * | 5/2003 | Hashimoto | ......... 348/229.1 |
| 6,614,477 B1 | 9/2003 | Lee et al. | |
| 6,836,288 B1 * | 12/2004 | Lewis | ......... 348/229.1 |
| 6,882,363 B1 * | 4/2005 | Oda et al. | ......... 348/226.1 |
| RE38,771 E * | 8/2005 | Shibuya et al. | ......... 348/362 |
| 7,245,320 B2 * | 7/2007 | Kaplinsky et al. | ......... 348/229.1 |
| 7,274,398 B2 * | 9/2007 | Pearson | ......... 348/296 |
| 2002/0175954 A1 | 11/2002 | Pearson | |
| 2003/0030740 A1 | 2/2003 | Tsujino | |
| 2003/0223010 A1 | 12/2003 | Kaplinsky et al. | |
| 2005/0163492 A1 * | 7/2005 | Ueda et al. | ......... 386/109 |
| 2007/0024741 A1 * | 2/2007 | Moriya et al. | ......... 348/363 |

FOREIGN PATENT DOCUMENTS

| | | | |
|---|---|---|---|
| GB | 2322496 A | | 8/1998 |
| JP | 64-078081 | | 3/1989 |
| JP | 2000032330 A | * | 1/2000 |
| JP | 2001-257931 | | 9/2001 |
| JP | 2002-238000 | | 8/2002 |
| JP | 2003244538 A | * | 8/2003 |
| JP | 2003-259199 | | 9/2003 |

* cited by examiner

*Primary Examiner*—John M Villecco
(74) *Attorney, Agent, or Firm*—Arent Fox LLP

(57) ABSTRACT

An automatic gain control circuit generates, based on comparison between an average brightness of brightness data output for each frame from an image sensor and a target brightness, an integration time adjustment signal for adjusting an integration time during which the image sensor is exposed, a gain adjustment signal for adjusting gain of an amplifier that amplifies an output signal of the image sensor, and a frame rate adjustment signal for changing a frame rate. The automatic gain control circuit includes an exposure control circuit for adjusting a blanking time of each frame and generating, as the frame rate adjustment signal, a maximum integration time adjustment signal for switching a maximum integration time of the image sensor.

14 Claims, 10 Drawing Sheets

Fig.3
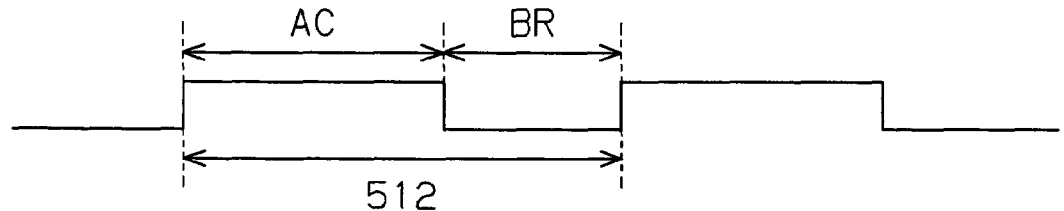
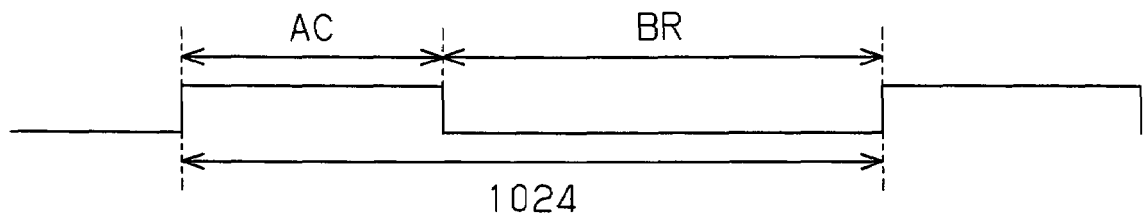
Fig.4
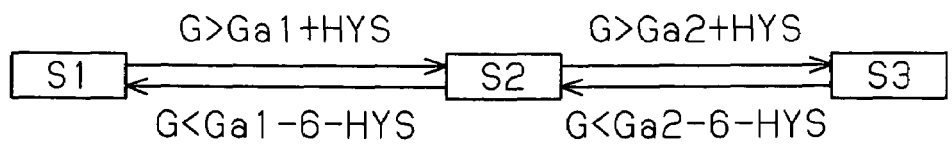

| SEL2 | SEL3 | |
|---|---|---|
| 0 | 0 | Select×1 |
| 1 | 0 | Select×0.5 |
| 0 | 1 | Select×2 |

Fig.8

| Total Gain | Amplifier Gain (G) | Exposure Time |
|---|---|---|
| 1 | 0 | 1 |
| 1.125 | 1 | 1 |
| 1.25 | 2 | 1 |
| 1.375 | 3 | 1 |
| 1.5 | 4 | 1 |
| 1.625 | 4 | 1 |
| 1.75 | 5 | 1 |
| 1.875 | 6 | 1 |
| 2 | 0 | 2 |
| 2.125 | 0 | 2 |
| 2.25 | 1 | 2 |
| 2.375 | 1 | 2 |
| 2.5 | 2 | 2 |
| 2.625 | 2 | 2 |
| 2.75 | 2 | 2 |
| 2.875 | 3 | 2 |
| 3 | 0 | 3 |
| 3.125 | 0 | 3 |
| 3.25 | 0 | 3 |
| 3.375 | 1 | 3 |
| 3.5 | 1 | 3 |
| 3.625 | 1 | 3 |
| 3.75 | 2 | 3 |
| 3.875 | 2 | 3 |
| 4 | 0 | 4 |

| Total Gain | Amplifier Gain (G) | Exposure Time |
|---|---|---|
| 1 | 0 | 1 |
| 2 | 0 | 2 |
| 3 | 0 | 3 |
| 4 | 0 | 4 |

AUTOMATIC GAIN CONTROL CIRCUIT WITH EXPOSURE CONTROL CIRCUIT

CROSS-REFERENCE TO RELATED APPLICATIONS

This nonprovisional application is a continuation application of and claims the benefit of International Application No. PCT/JP2004/003527, filed Mar. 17, 2004. The disclosure of the prior application is hereby incorporated herein in its entirety by reference.

BACKGROUND OF THE INVENTION

The present invention relates to an automatic gain control (AGC) circuit used to control exposure for an image sensor installed in an imaging device, such as a digital still camera or a digital video camera.

Many camera systems using an image sensor (CCD or CMOS) are provided with an AGC function for automatically correcting exposure in accordance with the brightness of a subject that is to be imaged. The AGC function calculates the brightness of the image and corrects exposure based on the difference between the calculated brightness and the target brightness. The exposure adjustment is enabled by adjusting the gain of an amplifier, which amplifies an output signal of an imaging device, or by adjusting the exposure time. The AGC function is required to perform the exposure adjustment operation in a smoother manner and increase the exposure adjustment range.

An AGC circuit installed in an imaging device, such as a digital still camera or a digital video camera, handles image subjects of which brightness ranges widely from a high brightness to a low brightness. To handle such image subjects, the AGC circuit dynamically adjusts the frame rate in accordance with the brightness of each image subject. The frame rate is changed by changing a clock signal, which controls an image sensor. More specifically, the clock signal for the image sensor is generated by dividing the frequency of a reference clock signal, and the clock signal is changed by changing the frequency division ratio.

FIG. 10 shows a prior art example of an AGC circuit that changes the frame rate based on a frequency division signal of the reference clock signal.

In the drawing, an image sensor block 1 includes an element array 2, which is formed by a large quantity of photoelectric conversion elements such as CMOS image sensors, an amplifier 3, an AD converter 4, a timing control circuit 5, and a frequency division circuit 6.

The frequency division circuit 6 generates an internal clock signal CLK by dividing the frequency of a reference clock signal SCLK and provides the timing control circuit 5 with the generated signal. The timing control circuit 5 generates a horizontal/vertical synchronization signal HV based on the internal clock signal CLK and outputs signals including a reset signal and a read signal to the element array 2.

The element array 2 performs a reset operation and a read operation for every line of the photoelectric conversion elements based on the reset signal and the read signal, and sequentially provides the amplifier 3 with the read data. The amplifier 3 amplifies the read data, and the AD converter 4 converts an output signal of the amplifier 3 into a digital value to generate brightness data BD.

An AGC circuit 7 includes an adder 8, a flip-flop circuit 9, a divider 10, and an exposure control circuit 11.

The adder 8 receives the brightness data BD from the AD converter 4. Then, the adder 8, the flip-flop circuit 9, and the divider 10 operate to calculate an average brightness Y1 for each frame. Such operations are performed in synchronization with the operation of the image sensor block 1 based on the horizontal/vertical synchronization signal HV, which is provided from the image sensor block 1.

The exposure control circuit 11 receives the average brightness Y1, which is provided from the divider 10, and a target brightness T, which is set in advance in a storage unit, such as a register. Then, based on the difference between the target brightness T and the average brightness Y1 the exposure control circuit 11 provides the amplifier 3 with a gain adjustment signal A1, the timing control circuit 5 with an integration (exposure) time adjustment signal A2, and the frequency division circuit 6 with a frequency division ratio setting signal A3.

The amplifier 3 adjusts the gain based on the gain adjustment signal A1. The timing control circuit 5 adjusts the integration time, which is the time interval between the reset signal and read signal provided to each element, based on the integration (exposure) time adjustment signal A2. The frequency division circuit 6 sets the frequency division ratio based on the frequency division ratio setting signal A3.

The AGC circuit controls the average brightness Y1 so that it becomes equal to the target brightness T based on the gain adjustment signal A1, the integration time adjustment signal A2, and the frequency division ratio setting signal A3, which are provided from the exposure control circuit 11, when the average brightness Y1 and the target brightness T input to the exposure control circuit 11 differ from each other.

More specifically, the average brightness Y1 is adjusted by adjusting the total gain based on a combination of the gain adjustment of the amplifier 3 performed with the gain adjustment signal A1, the integration time adjustment performed with the integration time adjustment signal A2, and the frame rate change performed with the frequency division ratio setting signal A3.

When the brightness of the imaging subject is high, the total gain is changed based solely on the integration time adjustment. When the brightness of the imaging subject is medium or low, the total gain is changed based on the integration time adjustment, the frame rate change, and the gain adjustment of the amplifier 3.

FIG. 11 shows the operation of an AGC circuit such as that described above for adjusting the average brightness Y1 based on the adjustment of the gain G1 of the amplifier 3 and the change of the frame rate FL when the average brightness Y1 of each frame is lower than the target brightness T.

When, for example, the average brightness Y1 is lower than the target brightness while the circuit is operating at a frame rate FL of 30 fps, the gain G1 of the amplifier 3 is raised based on the gain adjustment signal A1. As a result, the average brightness Y1 increases.

When the gain G1 of the amplifier 3 reaches a predetermined level that is set in advance but the average brightness Y1 does not reach the target brightness T, the frame rate FL is changed from 30 fps to 15 fps. As a result, the integration time becomes two times longer. This instantaneously increases the average brightness Y1 by two times.

When the average brightness Y1 exceeds the target brightness T, the gain G1 of the amplifier 3 is lowered to decrease the average brightness Y1. If the average brightness Y1 is higher than the target brightness T after a predetermined time elapses, the frame rate FL is changed again from 15 fps to 30 fps to increase the gain G1 of the amplifier 3.

Next, if the average brightness Y1 does not reach the target brightness T after the predetermined time elapses, the frame rate FL is changed again from 30 fps to 15 fps.

This operation equalizes the average brightness Y1 with the target brightness T. As a result, the gain G1 of the amplifier 3 and the average brightness Y1 converge on fixed levels.

Further, when the brightness of the imaged subject is high, the total gain is adjusted based solely on the integration time adjustment signal. FIG. 12 shows the change of the exposure time when the total gain is adjusted based solely on the integration time adjustment signal A2. The exposure time is controlled based on the number of pulses of a clock signal that is provided from the frequency division circuit. Thus, the exposure time is proportional to the value of the total gain.

In the structure described above, the frame rate is changed by dividing the frequency of the reference clock signal SCLK and changing the internal clock signal CLK that is input in the timing control circuit 5. This changes the frame rate at a ratio obtained by multiplying two by an integer. Then, when the frame rate is lowered because the imaged subject has a low brightness, the responsiveness to the movement of the image subject is lowered. Thus, the image may become unstable and the image may not be smooth.

As shown in FIG. 11, when the frame rate is switched, the total gain changes instantaneously. In this case, the average brightness Y1 of the imaged data changes greatly. As a result, the exposure control fails to be performed smoothly, and the time required for convergence of the average brightness Y1 increases.

Further, because the internal clock signal CLK changes based on the change of the frame rate, the output timing of the image also changes dynamically in accordance with the change of the internal clock signal CLK. This complicates the structure for achieving synchronization between systems that transmit and receive the image.

Further, as shown in FIG. 12, when the total gain is changed from 1 to 2 and the exposure time is adjusted based solely on the integration time adjustment signal A2 in an area in which the total gain is at its minimum, the exposure time is also changed from 1 to 2. Setting the exposure time at 1 would mean setting the exposure time at a value corresponding to one pulse of the internal clock signal CLK and setting the interval between a reset signal and a read signal at a value corresponding to one pulse of the internal clock signal CLK.

Thus, when the exposure time changes from 1, which is the shortest exposure time, to 2, which is the next exposure time, the exposure control is executed only when the average brightness changes by at least ½ of the average brightness value. In other words, when the average brightness is lowered while the circuit is operating with the shortest exposure time and the exposure time changes to the next exposure time, the brightness of the imaged data changes instantaneously. In this case, smooth exposure control cannot be executed.

For the reasons described above, in the tolerable exposure time range of the photoelectric conversion elements in the element array 2, values close to the shortest exposure time are not used. Accordingly, the performance of the image sensor is underused in the exposure control at the high brightness side, and the exposure control range is limited.

The present invention provide an AGC circuit that executes smooth exposure control when the brightness of imaged data changes and increases the range of exposure control executed in accordance with the brightness of the imaging subject.

SUMMARY OF THE INVENTION

A first aspect of the present invention is an automatic gain control circuit for outputting, based on comparison between a target brightness and an average brightness of brightness data output in units of frames from an image sensor, an integration time adjustment signal for adjusting an integration time during which the image sensor is exposed, a gain adjustment signal for adjusting a gain of an amplifier that amplifies an output signal of the image sensor, and a frame rate adjustment signal for changing a frame rate. The automatic gain control circuit includes an exposure control circuit for adjusting a blanking time of each frame, and outputting, as the frame rate adjustment signal, a maximum integration time adjustment signal for switching a maximum integration time of the image sensor.

A second aspect of the present invention is an automatic gain control circuit for receiving brightness data output in units of frames from an image sensor, adjusting an integration time during which the image sensor is exposed, and amplifying gain of an amplifier that amplifies an output signal of the image sensor. The automatic gain control circuit includes a total gain calculation circuit for calculating a total gain based on an average brightness and a target brightness. A decoder circuit for generates, based on the total gain and a maximum integration time adjustment signal, an integration time adjustment signal for adjusting the integration time and a gain adjustment signal for adjusting the gain of the amplifier. A maximum integration time switch circuit generates the maximum integration time adjustment signal to switch a maximum integration time based on comparison between the gain adjustment signal and a reference gain value, and generates a selection signal relating to the switching of the maximum integration time. A total gain correction circuit, connected between the total gain calculation circuit and the decoder circuit, corrects the total gain to offset change in the maximum integration time based on the selection signal from the maximum integration time switch circuit.

A third aspect of the present invention is an automatic gain control circuit for receiving brightness data output in units of frames from an image sensor, adjusting an integration time during which the image sensor is exposed, and amplifying gain of an amplifier that amplifies an output signal of the image sensor. The automatic gain control circuit includes a total gain calculation circuit for calculating a total gain based on an average brightness and a target brightness. A decoder circuit generates, based on the total gain and a maximum integration time adjustment signal, an integration time adjustment signal for adjusting the integration time and a gain adjustment signal for adjusting the gain of the amplifier. A maximum integration time switch circuit generates the maximum integration time adjustment signal to switch a maximum integration time based on comparison between the gain adjustment signal and a reference gain value and generates a rate signal showing change in the maximum integration time. A total gain correction circuit, connected between the total gain calculation circuit and the decoder circuit, corrects the total gain to offset change in the maximum integration time based on the rate signal from the maximum integration time switch circuit.

A fourth aspect of the present invention is an automatic gain control circuit for changing gain of an amplifier that amplifies an output signal of an image sensor and a frame rate based on brightness information detected by the image sensor. The automatic gain control circuit includes a gain change circuit for instructing, when the frame rate is changed, change in the gain of the amplifier in correspondence with a substantial inverse of a ratio of the change of the frame rate.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is an explanatory diagram showing the operation for adjusting the maximum integration time;

FIG. 4 is an explanatory diagram showing the operation of a sequence circuit included in the AGC circuit of FIG. 1;

FIG. 8 is an explanatory diagram showing the relationship between the amplifier gain and the exposure time that are adjusted by the total gain;

DETAILED DESCRIPTION OF THE PREFERRED EMBODIMENTS

First Embodiment

Figure 13:
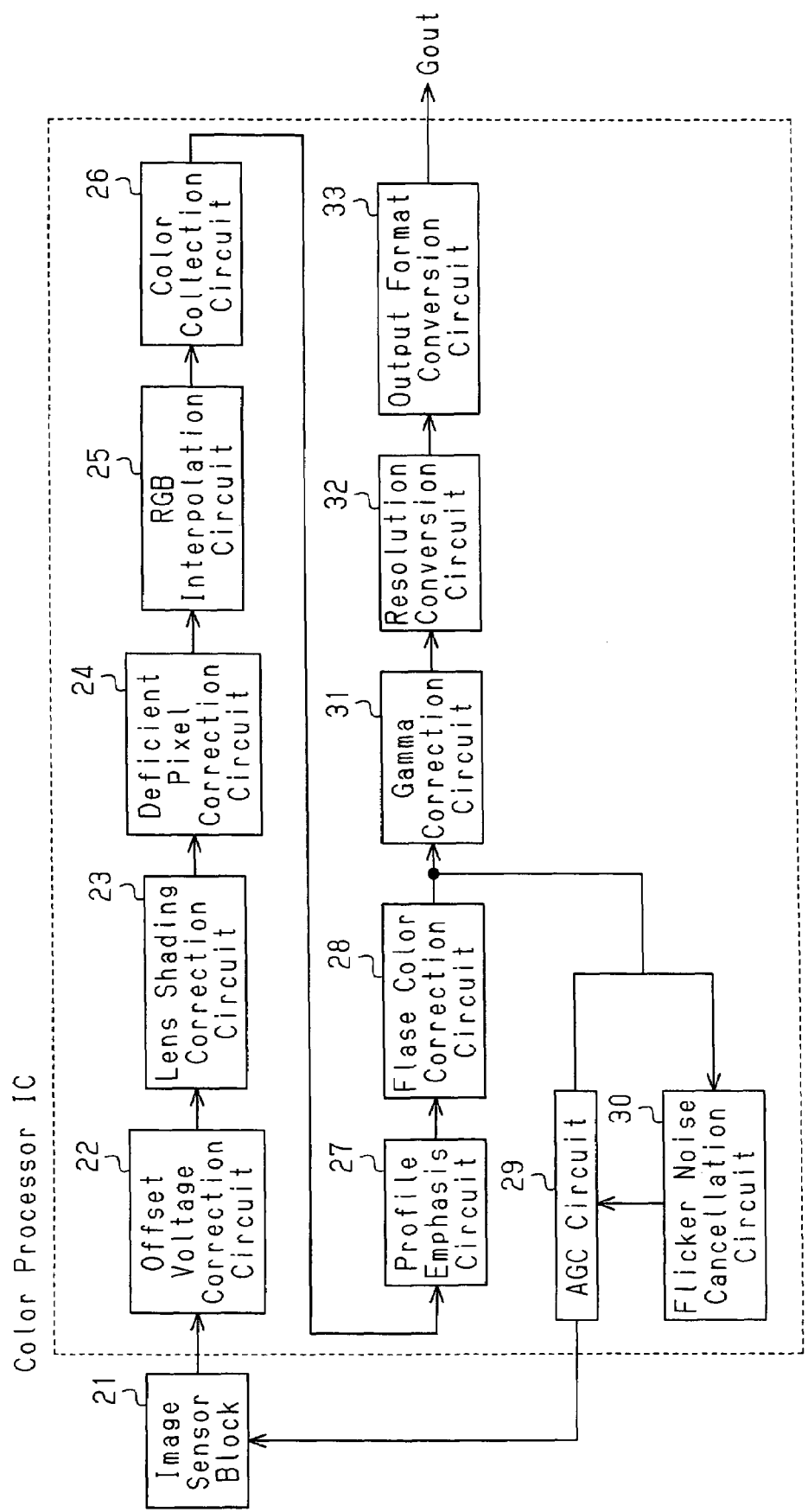
FIG. 13 is a block diagram showing a color processor IC.

FIG. 13 schematically shows a color processor IC on which an AGC circuit of the present invention is mounted. An output signal of an image sensor block 21 is provided to an AGC circuit 29 and a flicker noise cancellation circuit 30 via an offset voltage correction circuit 22, a lens shading correction circuit 23, a deficient pixel correction circuit 24, an RGB interpolation circuit 25, a color correction circuit 26, a profile emphasis circuit 27, and a false color correction circuit 28.

An output signal of the false color correction circuit 28 is output as a video data signal Gout from an output format conversion circuit 33 via a gamma correction circuit 31 and a resolution conversion circuit 32.

Figure 1:
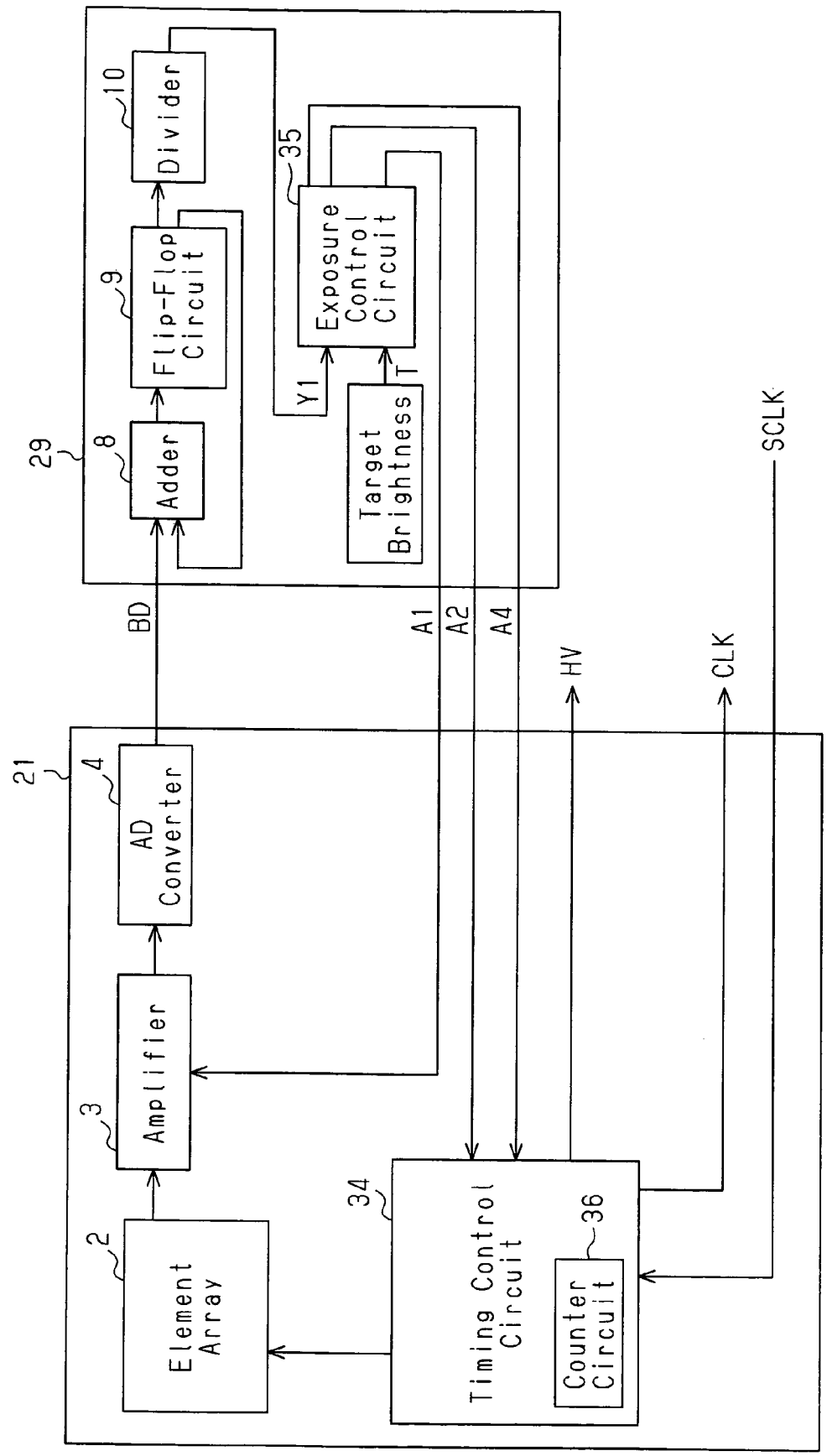
FIG. 1 is a block diagram showing an AGC circuit and an image sensor block according to a first embodiment of the present invention.
Figure 10:
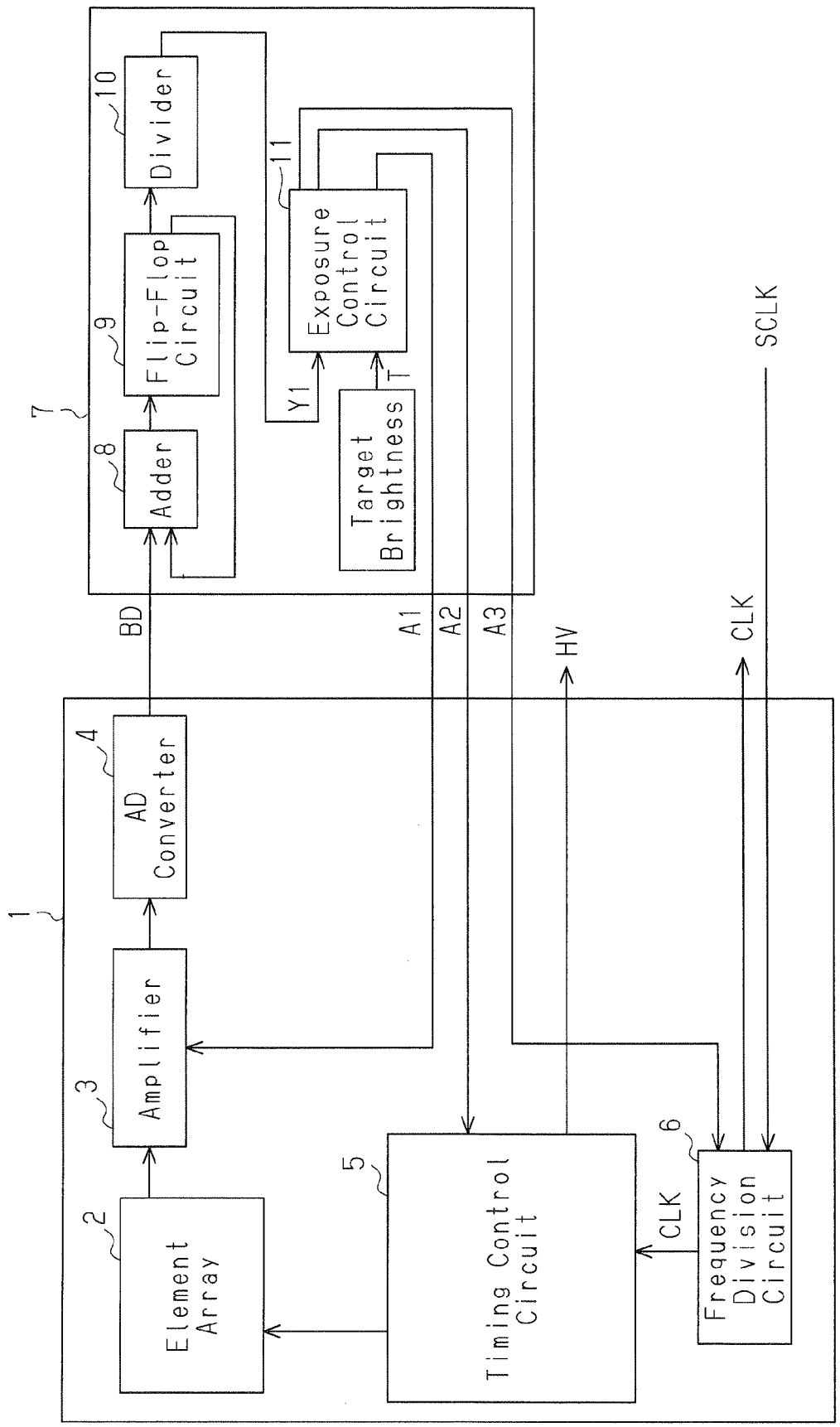
FIG. 10 is a block diagram showing an AGC circuit in the prior art.

The AGC circuit 29 operates to maintain the brightness of an output signal output from the image sensor block 21 to be a predetermined brightness. The structures of the AGC circuit 29 and the image sensor block 21 will now be described with reference to FIG. 1. In the drawing, the components that are the same as the components of the conventional example shown in FIG. 10 will be described using the same reference numerals. Further, although the AGC circuit 29 receives an output signal of the flicker noise cancellation circuit 30 and contributes to the flicker noise cancellation operation, the part of the AGC circuit 29 relating to the flicker noise cancellation operation is not shown in FIG. 1 and will not be described here because the present invention is not pertinent to the flicker noise cancellation operation.

The image sensor block 21 includes an element array 2, an amplifier 3, an AD converter 4, and a timing control circuit 34. The timing control circuit 34 receives a reference clock signal SCLK, and generates a horizontal/vertical synchronization signal HV in accordance with the reference clock signal SCLK and provides the element array 2 with signals including a reset signal and a read signal.

The element array 2 includes a plurality of photoelectric conversion elements, which are arranged in a matrix, and performs a reset operation and a read operation for every line of the photoelectric conversion elements based on the reset signal and the read signal, and sequentially provides the amplifier 3 with the read data. The amplifier 3 amplifies the read data (analog signal) and the AD converter 4 converts an analog output signal of the amplifier 3 into a digital value to generate a digital signal.

The AGC circuit 29 includes an adder 8, a flip-flop circuit 9, a divider 10, and an exposure control circuit 35.

The adder 8 receives an output signal of the AD converter 4 as brightness data BD. The adder 8, the flip-flop circuit 9, and the divider 10 operate to calculate an average brightness Y1 corresponding to one frame. Their operations are performed in synchronization with the operation of the image sensor block 21 based on the horizontal/vertical synchronization signal HV, which is provided from the image sensor block 21.

The exposure control circuit 35 receives the average brightness Y1, which is provided from the divider 10, and a target brightness T, which is preset in a storage unit, such as a register. The exposure control circuit 35 provides the amplifier 3 with a gain adjustment signal A1, the timing control circuit 34 with an integration (exposure) time adjustment signal A2 and a maximum integration time adjustment signal A4, based on the difference between the target brightness T and the average brightness Y1.

Accordingly, the amplifier 3 adjusts its gain in accordance with the gain adjustment signal A1. The timing control circuit 34 adjusts the integration time, which is the time interval between a reset signal and a read signal that are provided to each element, based on the integration (exposure) time adjustment signal A2. Further, the timing control circuit 34 sets the time corresponding to one frame based on the maximum integration time adjustment signal A4 and a count value of the reference clock signal SCLK counted by an incorporated counter circuit 36.

More specifically, as shown in FIG. 3, when the maximum integration time MAX-EXP is set at 512 based on the maximum integration time adjustment signal A4, the timing control circuit 34 sets the time corresponding to 512 pulses of the reference clock signal SCLK (corresponding to 15 fps) as one frame. Then, the timing control circuit 34 outputs the reset signal and the read signal based on a vertical synchronization signal during an active period AC within the one frame.

Further, when the maximum integration time MAX-EXP is set at 1024 based on the maximum integration time adjustment signal A4, the timing control circuit 34 sets the time corresponding to 1024 pulses of the reference clock signal SCLK (corresponding to 7.5 fps) as one frame. Then, the timing control circuit 34 outputs the reset signal and the read signal based on the vertical synchronization signal during the active period AC within that frame.

The timing control circuit 34 does not change the active period AC of each frame based on the maximum integration time adjustment signal A4 and changes only a blanking period BR. Then, when the maximum integration time MAX-EXP is set at 1024, the integration time of each element in the element array 2 is adjustable within the time range that is two times greater than the range used when the maximum integration time MAX-EXP is set at 512.

The image sensor block 21 controls the average brightness Y1 to become equal to the target brightness T based on the gain adjustment signal A1, the integration time adjustment signal A2, and the maximum integration time adjustment signal A4, which are output from the exposure control circuit 35, when the average brightness Y1 and the target brightness T that are input in the exposure control circuit 35 differ from each other.

Figure 2:
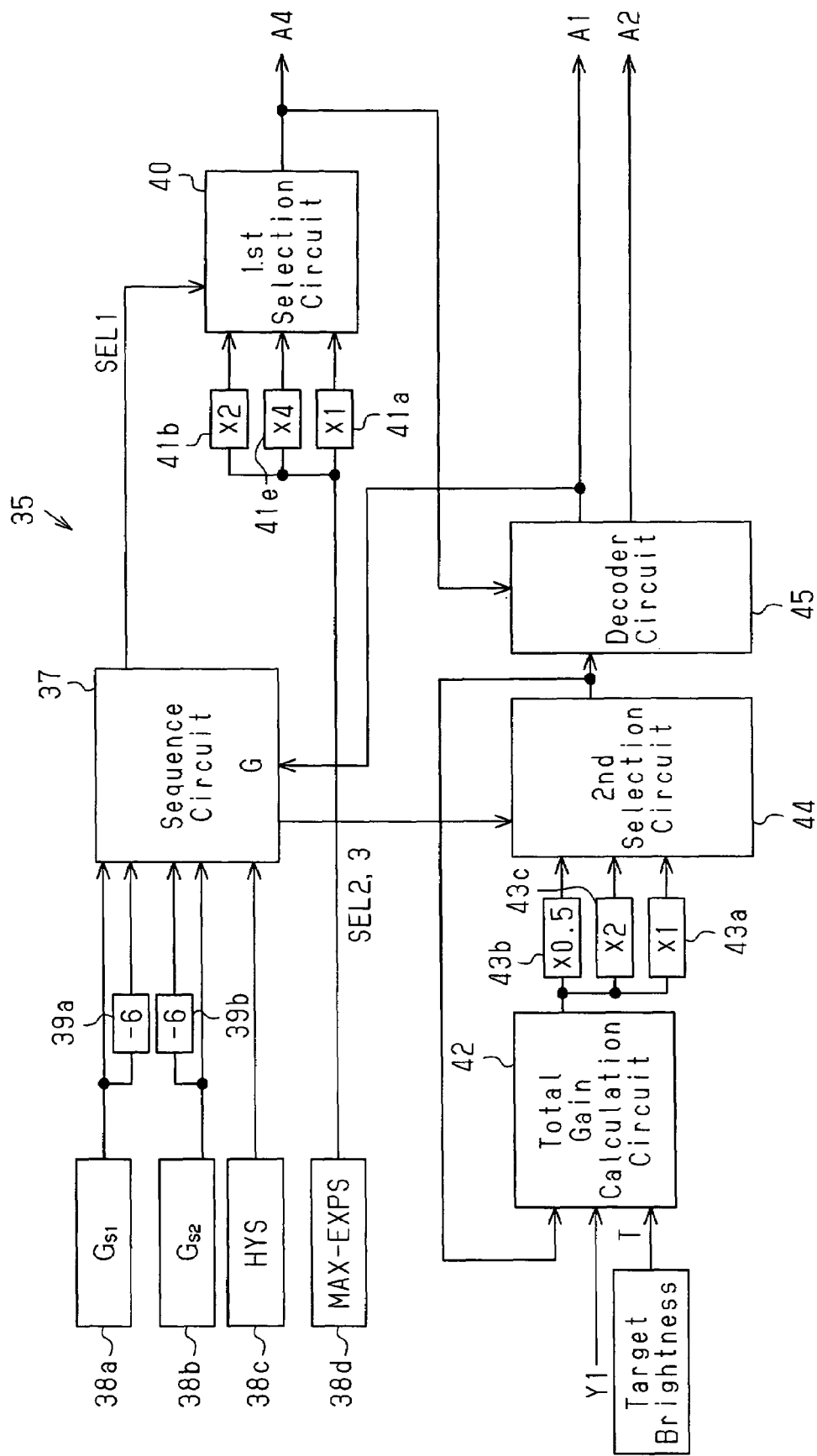
FIG. 2 is a block diagram showing an exposure control circuit included in the AGC circuit of FIG. 1.

FIG. 2 shows the specific structure of the exposure control circuit 35. A sequence circuit 37 is provided with first and second gain reference values Gs1 and Gs2, which are stored in registers (storage units) 38a and 38b, and a hysteresis value HYS, which is stored in a register 38c.

Subtraction units 39a and 39b attenuate each of the first and second gain reference values Gs1 and Gs2 by 6 dB to generate attenuation values and provide the sequence circuit 37 with the generated attenuation values. Then, the sequence circuit 37 operates in accordance with the state transition diagram shown in FIG. 4 based on the comparison between the gain value G, which is set based on the gain adjustment signal A1 provided from a decoder circuit 45 (described later) and each value, and generates first to third selection signals SEL1 to SEL3.

The first selection signal SEL1 is provided to a first selection circuit 40. A multiplier 41a multiplies a reference maximum integration time MAX-EXPS, which is stored in the register 38d, by one and provides the first selection circuit 40 with the reference maximum integration time MAX-EXPS. A multiplier 41b multiplies the reference maximum integration time MAX-EXPS by two and provides the first selection circuit 40 with the reference maximum integration time MAX-EXPS multiplied by two. A multiplier 41c multiplies the reference maximum integration time MAX-EXPS by four and provides the first selection circuit 40 with the reference maximum integration time MAX-EXPS multiplied by four.

As shown in FIG. 4, the sequence circuit 37 is set in state S1 when the gain value G is smaller than a first reference gain value Ga1. When the gain value G increases from this state and exceeds the sum of the first reference gain value Ga1 and the hysteresis value HYS, the sequence circuit 37 shifts to state S2.

When the gain value G further increases from this state and exceeds the sum of a second reference gain value Ga2 and the hysteresis value HYS, the sequence circuit 37 shifts to state S3.

When the gain value G decreases from state S3 and becomes smaller than a value obtained by subtracting 6 dB and the hysteresis value HYS from the second reference gain value Ga2, the sequence circuit 37 shifts to state S2.

When the gain value G further decreases from state S2 and becomes smaller than a value obtained by subtracting 6 dB and the hysteresis value HYS from the second reference gain value Ga2, the sequence circuit 37 shifts to state S1.

Figure 5:
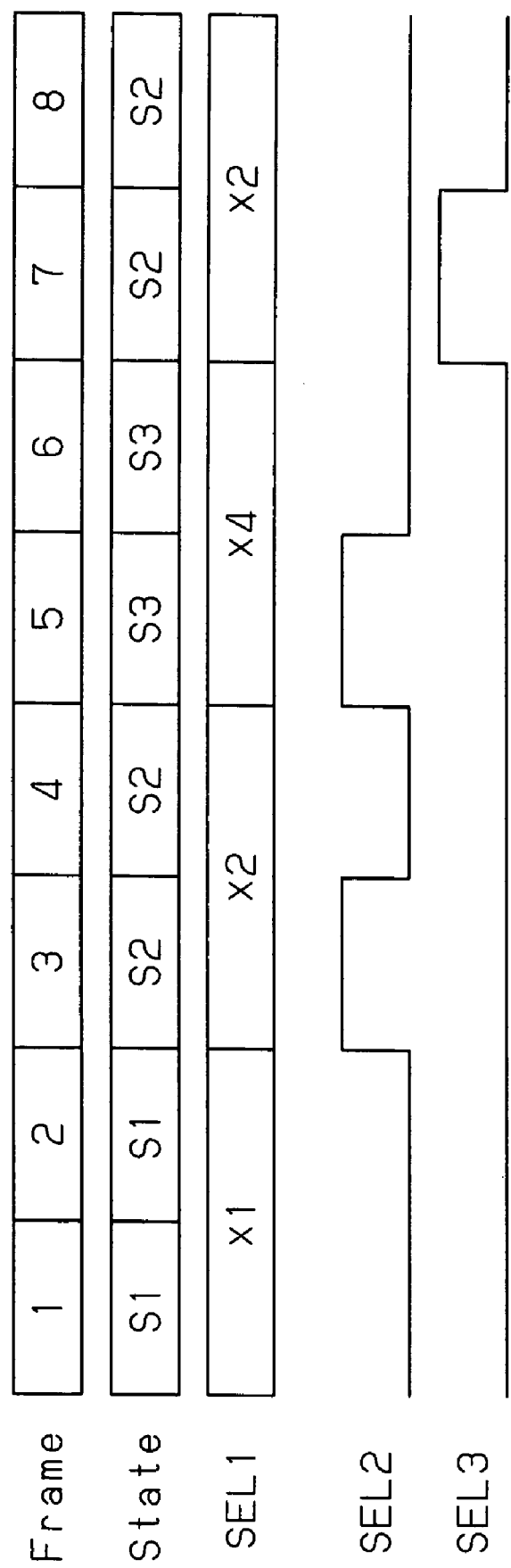
FIG. 5 is an explanatory diagram showing the operations of the sequence circuit and a first selection circuit included in the AGC circuit of FIG. 1.

FIG. 5 is a timing chart showing one example of the operation of the sequence circuit 37, which performs the above-described operation. When the sequence circuit 37 is in state S1 in frames 1 and 2, the first selection circuit 40 selects a value obtained by multiplying the reference maximum integration time MAX-EXPS by one (MAX-EXPS*1) as the maximum integration time MAX-EXP in accordance with the first selection signal SEL1 and outputs the maximum integration time adjustment signal A4 corresponding to MAX-EXPS*1.

Next, when the sequence circuit 37 shifts to state S2 in frames 3 and 4, the first selection circuit 40 selects a value obtained by multiplying the reference maximum integration time MAX-EXPS by two (MAX-EXPS*2) as the maximum integration time MAX-EXP in accordance with the first selection signal SEL1 and outputs the maximum integration time adjustment signal A4 corresponding to MAX-EXPS*2.

Next, when the sequence circuit 37 shifts to state S3 in frames 5 and 6, the first selection circuit 40 selects a value obtained by multiplying the reference maximum integration time MAX-EXPS by four (MAX-EXPS*4) as the maximum integration time MAX-EXP in accordance with the first selection signal SEL1 and outputs the maximum integration time adjustment signal A4 corresponding to MAX-EXPS*4.

Next, when the sequence circuit 37 shifts to state S2 in frames 7 and 8, the first selection circuit 40 selects the value obtained by multiplying the reference maximum integration time MAX-EXPS by two (MAX-EXPS*2) as the maximum integration time MAX-EXP in accordance with the first selection signal SEL1 and outputs the maximum integration time adjustment signal A4 corresponding to MAX-EXPS*2.

Accordingly, the three-step state shifting between states S1 to S3 based on the change of the gain value G enables one of the three values of the maximum integration time MAX-EXP to be selected. As a result, the maximum integration time adjustment signal A4 is output.

Figures 11, 12:
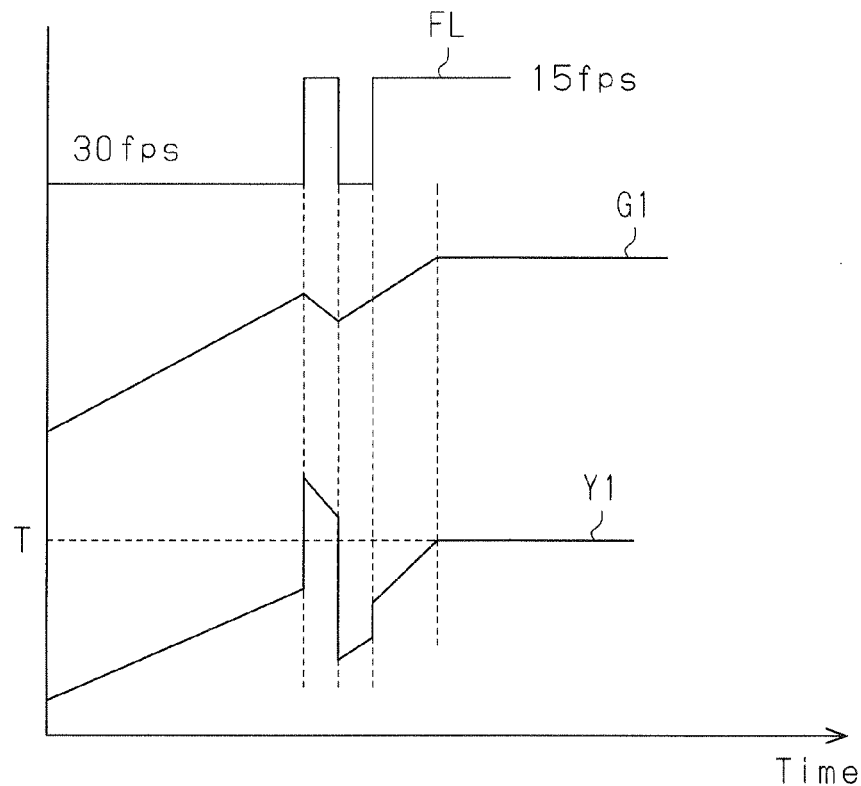
FIG. 11 is an explanatory diagram showing the operation of adjusting the average brightness in the AGC circuit of FIG. 10.
FIG. 12 is an explanatory diagram showing the relationship between the amplifier gain and the exposure time that are adjusted by the total gain in the AGC circuit of FIG. 10.

A total gain calculation circuit 42 receives the target brightness T and the average brightness Y of each frame and also holds a total gain value that is calculated in the preceding frame. The total gain calculation circuit 42 calculates a correction value based on the target brightness T and the average brightness Y1 and multiplies the total gain value of the preceding frame by the correction value to calculate a new total gain. The total gain is calculated to decimal places as shown in FIG. 8 and is more accurate than the total gain calculated in the conventional example shown in FIG. 12.

The total gain calculated by the total gain calculation circuit 42 is provided to three multipliers 43a, 43b, and 43c. The multiplier 43a multiplies the total gain by one and provides the second selection circuit 44 with the total gain multiplied by one. The multiplier 43b multiplies the total gain by ½ and provides the second selection circuit 44 with the total gain multiplied by ½. The multiplier 43c multiplies the total gain by two and provides the second selection circuit 44 with the total gain multiplied by two.

The second selection circuit 44 receives second and third selection signals SEL2 and SEL3 from the sequence circuit 37. As shown in FIG. 5, the second and third selection signals SEL2 and SEL3 rise to a high (H) level in each frame in which the state shifting occurs between states S1 to S3. The second and third selection signals SEL2 and SEL3 fall to a low (L) level in other frames. In detail, the second selection signal SEL2 rises to an H level in the frame in which the sequence circuit 37 shifts from state S1 to state S2 and in the frame in which the sequence circuit 37 shifts from state S2 to state S3. The third selection signal SEL3 rises to an H level in the frame in which the sequence circuit 37 shifts from state S3 to state S2 and the frame in which the sequence circuit 37 shifts from state S2 to state S1.

The second selection circuit 44 selects one of the three total gains, which are provided respectively from the multipliers 43a to 43c, based on the second and third selection signals SEL2 and SEL3, and provides the decoder circuit 45 with the selected total gain.

Figures 6, 7:
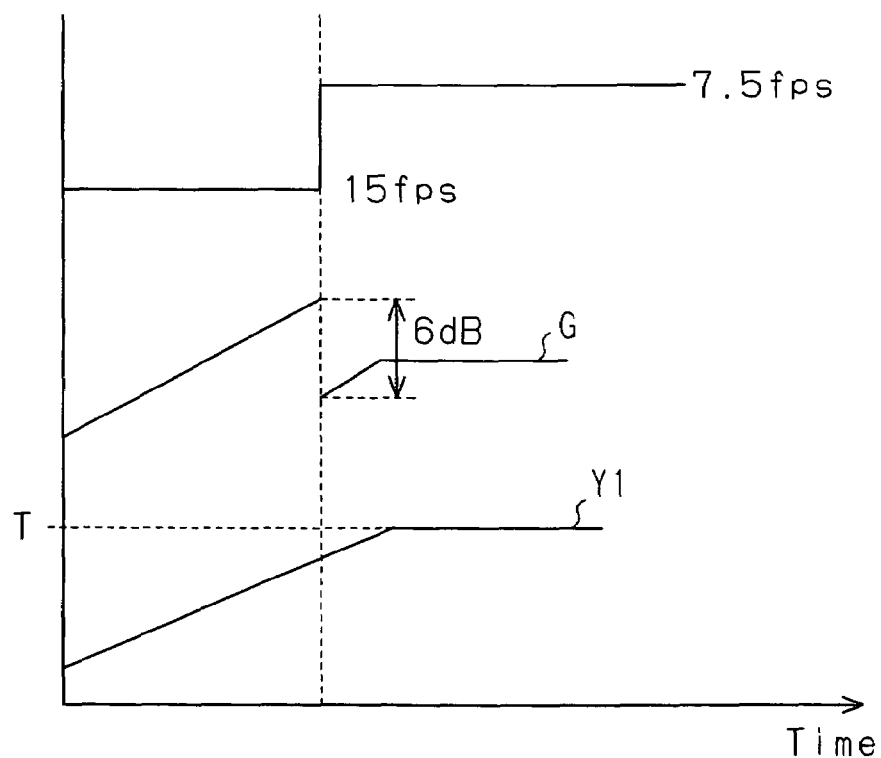
FIG. 6 is an explanatory diagram showing the operation of a second selection circuit included in the AGC circuit of FIG. 1.
FIG. 7 is an explanatory diagram showing the operation for adjusting the average brightness.

More specifically, as shown in FIG. 6, when the second and third selection signals SEL2 and SEL3 both have an L level, the second selection circuit 44 selects the total gain multiplied by one, which is provided from the total gain calculation circuit 42, and provides the decoder circuit 45 with the selected total gain. When the second selection signal SEL2 has an H level and the third selection signal SEL3 has an L level, the second selection circuit 44 selects the total gain multiplied by ½, which is provided from the total gain calculation circuit 42, and provides the decoder circuit 45 with the selected total gain. When the second selection signal SEL2 has an L level and the third selection signal SEL3 has an H level, the second selection circuit 44 selects the total gain multiplied by two, which is provided from the total gain calculation circuit 42, and provides the decoder circuit 45 with the selected total gain.

When the sequence circuit 37 shifts from state S1 to state S2 and from state S2 to state S3, the frame rate substantially increases by two times based on the maximum integration time adjustment signal A4, which is provided from the first selection circuit 40, and the exposure time is instantaneously set to be two times greater. However, as described above, the total gain multiplied by ½ is selected in this case. The selection of the total gain multiplied by ½ offsets such a rapid increase in the exposure time. In other words, when the frame rate is changed, the gain of the amplifier 3 is changed by an amount substantially corresponding to the inverse of the amount of change in the frame rate.

Further, when the sequence circuit 37 shifts from state S3 to state S2 and from state S2 to state S1, the frame rate substantially decreases to one half based on the maximum integration time adjustment signal A4, which is provided from the first selection circuit 40, and the exposure time is instantaneously set to be one half. However, as described above, the total gain multiplied by two is selected in this case. The selection of the total gain multiplied by two offsets such a rapid decrease in the exposure time.

The decoder circuit 45 receives the maximum integration time adjustment signal A4, which is provided from the first selection circuit 40, and the total gain, which is provided from the second selection circuit 44, and generates the gain adjustment signal A1 and the integration time adjustment signal A2 based on the total gain and the maximum integration time adjustment signal A4. The decoder circuit 45 determines the combination of the exposure time and the amplifier gain in a manner to satisfy the relationship of the total gain=the exposure time*$10^Y$ (where Y=the amplifier gain/20). In this expression, the exposure time is a value that is set based on the integration time adjustment signal A2, and the amplifier gain is a value that is set by the amplifier 3 based on the gain adjustment signal A1.

FIG. 8 shows in numerical values an example of the total gain that is provided to the decoder circuit 45, and values of the amplifier gain and the exposure time that are output from the decoder circuit 45 for the total gain values. FIG. 8 particularly shows a range in which the total gain is minimum.

Next, the operations of the AGC circuit 29 and the image sensor block 21 will be described. As shown in FIG. 7, when, for example, the average brightness Y1 provided to the exposure control circuit 35 is lower than the target brightness T while the circuit is operating at a frame rate of 15 fps, the total gain value output from the total gain calculation circuit 42 increases, and the gain of the amplifier 3 is raised based on the gain adjustment signal A1 from the decoder circuit 45, or the exposure time is lengthened based on the exposure time adjustment signal A2. As a result, the output level of the amplifier 3 increases and the average brightness Y1 increases.

When, for example, the gain G of the amplifier 3 exceeds the sum of the first reference gain value Ga1 and the hysteresis value HYS before the average brightness Y1 reaches the target brightness T, the sequence circuit 37 shifts from state S1 to state S2, and the maximum integration time MAX-EXP is increased by two times based on the first selection signal SEL1. Then, the frame rate is substantially changed from 15 fps to 7.5 fps.

The total gain provided to the decoder circuit 45 becomes one half based on the second selection signal SEL2, and the gain G of the amplifier 3 is attenuated by 6 dB based on the gain adjustment signal A1 and the exposure time adjustment signal A2 resulting from the calculation operation of the decoder circuit 45 shown in FIG. 8. As a result, the average brightness is prevented from instantaneously changing when the frame rate is changed.

Further, in the same manner, when the gain G of the amplifier 3 exceeds the sum of the second reference gain value Ga2 and the hysteresis value HYS and the sequence circuit 37 shifts from state S2 to state S3, the gain G of the amplifier 3 is attenuated by 6 dB at the same time as when the frame rate is changed.

Next, if the average brightness Y1 has not reached the target brightness T, the total gain value output from the total gain calculation circuit 42 increases and the gain G of the amplifier 3 increases. This operation increases the total gain value until the average brightness Y1 becomes equal to the target brightness T. As a result, the gain G of the amplifier 3 and the average brightness Y1 converge on fixed levels.

When, for example, the average brightness Y1 provided to the exposure control circuit 35 is higher than the target brightness T while the circuit is operating at a frame rate of 7.5 fps, the total gain value output from the total gain calculation circuit 42 decreases, and the gain G of the amplifier 3 is lowered based on the gain adjustment signal A1 from the decoder circuit 45, or the exposure time is shortened based on the exposure time adjustment signal A2. As a result, the output level of the amplifier 3 decreases and the average brightness Y1 decreases.

When, for example, the gain G of the amplifier 3 is lowered by at least a value obtained by subtracting the sum of 6 dB and the hysteresis value HYS from the second reference gain value Ga2 before the average brightness Y1 reaches the target brightness T, the sequence circuit 37 shifts from state S2 to state S1, and the maximum integration time MAX-EXP is lowered to one half based on the first selection signal SEL1. Then, the frame rate is substantially changed from 7.5 fps to 15 fps.

In this state, the total gain value is increased by two times based on the third selection signal SEL3, and the gain G of the amplifier 3 increases by 6 dB based on the gain adjustment signal A1 and the exposure time adjustment signal A2 resulting from the calculation operation of the decoder circuit 45 shown in FIG. 8. As a result, the average brightness is prevented from instantaneously changing when the frame rate is changed.

Further, in the same manner, when the gain of the amplifier 3 decreases by at least a value obtained by subtracting the sum of 6 dB and the hysteresis value HYS from the first reference gain value Ga1, and the sequence circuit 37 shifts from state S3 to state S2, the gain G of the amplifier 3 increases by 6 dB at the same time as when the frame rate is changed.

Next, if the average brightness Y1 has not reached the target brightness T, the total gain value output from the total gain calculation circuit 42 decreases and the gain G of the amplifier 3 decreases. This operation causes the total gain value to decrease until the average brightness Y1 becomes equal to the target brightness T. As a result, the gain G of the amplifier 3 and the average brightness Y1 converge on fixed levels.

In the AGC circuit 29 that performs the above-described operation, the operation for adjusting the gain G of the amplifier 3 and the exposure time particularly in an area in which the total gain is minimum (that is, in an area in which the brightness of a subject being imaged is relatively high and the exposure time of each element of the element array 2 may be set at a value in the vicinity of the shortest value of the tolerable exposure time range) will now be described.

As shown in FIG. 8, the total gain, of which minimum value is 1, is finely adjusted using values including decimals. When the total gain is 1, the gain G of the amplifier 3 is set at 0 dB and the exposure time is set at 1. The setting of the exposure time at 1 means setting the exposure time at a value corresponding to one pulse of the reference clock signal SCLK, or setting the interval between a reset signal and a read signal at a value corresponding to one pulse of the reference clock signal SCLK.

Then, in the operation of adjusting the total gain between 1 and 2, the gain of the amplifier 3 is increased to values from 1 to 6 dB while the exposure time remains fixed at 1. When the total gain becomes 2, the gain of the amplifier 3 is returned to 0 dB, and the exposure time is set at 2, or a value corresponding to two pulses of the reference clock signal SCLK.

In the same manner, in the operation of adjusting the total gain between 2 and 3, the gain of the amplifier 3 is increased to values from 1 to 3 dB while the exposure time remains fixed at 2. When the total gain becomes 3, the gain of the amplifier 3 is returned to 0 dB, and the exposure time is set at 3, or a value corresponding to three pulses of the reference clock signal SCLK.

Through such operations, in a range in which the exposure time is not changed, the adjustment of the gain of the amplifier 3 enables the gain of the amplifier 3 to be changed in fine steps, that is, in a range of values equal to or smaller than 1. Accordingly, even when the exposure time of each element of the element array 2 is set at a value in the vicinity of the shortest value of the tolerable exposure time range, changes in the average brightness Y1 are suppressed when the total gain is changed as compared with the prior art.

The AGC circuit 29 of the present embodiment has the advantages described below.

(1) The frame rate is changed by changing the blanking time BR of each frame and without changing the operation clock signal of the timing control circuit 34. This enables the frame rate to be changed at a ratio other than a ratio obtained by multiplying two by an integer. Thus, when the frame rate is lowered, changes in the average brightness Y1 are suppressed when the frame rate is changed. Further, the responsiveness of an image is prevented from being lowered. Since the output frequency of imaged data output from the image sensor block 21 becomes constant, the transfer of data to a circuit in the next stage is facilitated.

(2) The blanking time BR is changed by changing the maximum integration time MAX-EXP in three steps based on the comparison between the gain G of the amplifier 3 and each of the predetermined first and second reference gain values Ga1 and Ga2. Thus, the frame rate is substantially changed in three steps without changing the operation clock signal of the timing control circuit 34.

(3) When the sequence circuit 37 compares the gain G of the amplifier 3 with the first and second reference gain values Ga1 and Ga2, the hysteresis value HYS is added to or subtracted from the first and second reference gain values Ga1 and Ga2. Thus, when the gain G of the amplifier 3 changes between values in the vicinity of the first and second reference gain values Ga1 and Ga2, the maximum integration time MAX-EXP, or the frame rate, is prevented from being switched frequently and unnecessarily.

(4) When the maximum integration time MAX-EXP is increased by two times based on the first selection signal SEL1 provided from the sequence circuit 37, the gain of the amplifier 3 is attenuated to one half based on the second selection signal SEL2. Thus, the average brightness Y1 is prevented from changing when the frame rate is changed, and the exposure control is smoothly executed.

(5) When the maximum integration time MAX-EXP becomes one half based on the first selection signal SEL1 provided from the sequence circuit 37, the gain G of the amplifier 3 is increased by two times based on the second selection signal SEL2. Thus, the average brightness Y1 is prevented from changing when the frame rate is changed, and the exposures control is smoothly executed.

(6) When the sequence circuit 37 shifts from state S3 to state S2 or from state S2 to state S1, that is, when the maximum integration time MAX-EXP is shortened to by one half, the total gain is increased two times based on the third selection signal SEL3. Then, the gain of the amplifier 3 is increased by 6 dB. This means that 6 dB is added to the second reference gain value Ga2 or to the first reference gain value Ga1. With this operation, the first and second reference gain values Ga1 and Ga2 are corrected in accordance with the change in the gain of the amplifier 3.

(7) The total gain calculated by the total gain calculation circuit 42 is output in one or less fine steps and the gain G of the amplifier 3 is adjusted to change the total gain in a range of values smaller than 1. Thus, even when the exposure time of each element of the element array 2 is set at a value in the vicinity of the shortest value of the tolerable exposure time range, changes in the average brightness Y1 is suppressed when the total gain is changed as compared with the prior art. This increases the adjustable range of the exposure time to include the shortest tolerable value of the exposure time of each element.

Second Embodiment

Figure 9:
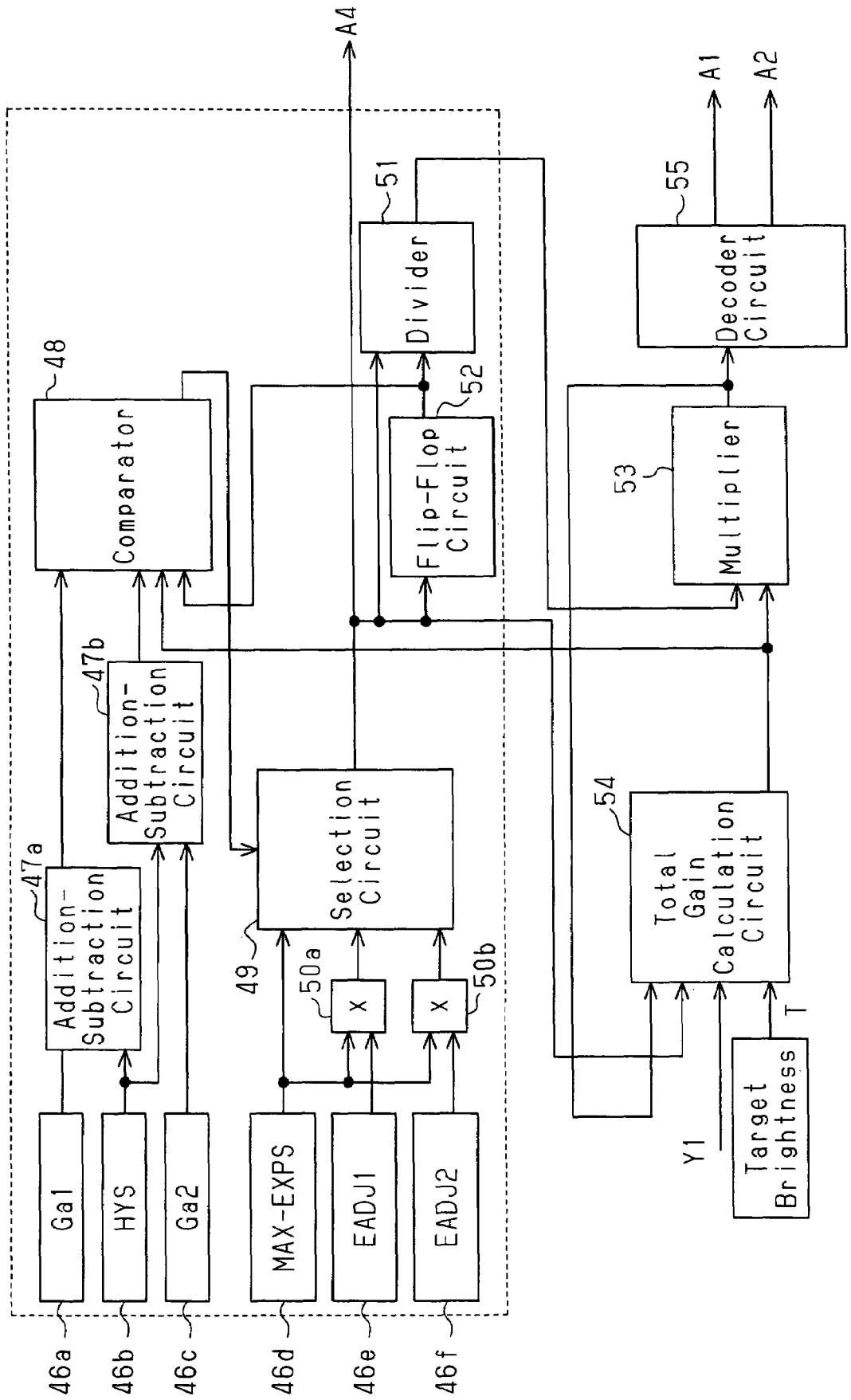
FIG. 9 is an explanatory diagram showing an exposure control circuit included in an AGC circuit according to a second embodiment of the present invention.

FIG. 9 shows an exposure control circuit 35 according to a second embodiment of the present invention. In the first embodiment, the maximum integration time MAX-EXP is selected from values in three steps that are fixed in advance. The structure of the second embodiment enables the three-step values of the maximum integration time to be variable.

A register 46a stores a first reference gain value Ga1. A register 46b stores a hysteresis value HYS. A register 46c stores a second reference gain value Ga2. A register 46d stores a reference maximum integration time MAX-EXPS. A register 46e stores a first operation coefficient EADJ1. A register 46f stores a second operation coefficient EADJ2.

The first reference gain value Ga1 and the hysteresis value HYS are provided to an addition-subtraction circuit 47a. The addition-subtraction circuit 47a provides a comparator 48 with an addition value that is obtained by adding the first reference gain value Ga1 and the hysteresis value HYS and a subtraction value that is obtained by subtracting the hysteresis value HYS from the first reference gain value Ga1.

The second reference gain value Ga2 and the hysteresis value HYS are provided to an addition-subtraction circuit 47b. The addition-subtraction circuit 47b provides the comparator 48 with an addition value that is obtained by adding the second reference gain value Ga2 and the hysteresis value HYS and a subtraction value that is obtained by subtracting the hysteresis value HYS from the second reference gain value Ga2.

A selection circuit 49 is provided with a reference maximum integration time MAX-EXPS, a multiplication value obtained by a multiplier 50a multiplying the reference maximum integration time MAX-EXPS and the first operation coefficient EADJ1 and a multiplication value obtained by a multiplier 50b multiplying the reference maximum integration time MAX-EXPS and the second operation coefficient EADJ2. Then, the selection circuit 49 selects one of the three values based on an output signal of the comparator 48, and outputs the selected value as the maximum integration time adjustment signal A4 for setting the maximum integration time MAX-EXP.

The maximum integration time MAX-EXP (maximum integration time adjustment signal A4) is provided to a divider 51 and a flip-flop circuit 52. An output signal of the flip-flop circuit 52 is provided to the divider 51 and the comparator 48. The flip-flop circuit 52 holds the maximum integration time MAX-EXP of each frame. Further, the flip-flop circuit 52 outputs the maximum integration time MAX-EXP of the preceding frame.

The divider 51 calculates a ratio of the maximum integration time MAX-EXP of the present frame and the maximum integration time MAX-EXP of the preceding frame. Further, the divider 51 provides a multiplier 53 with the calculation result.

A total gain calculation circuit 54 calculates the total gain of the present frame based on the average brightness Y1, the target brightness T, and the total gain of the preceding frame in the same manner as in the first embodiment.

The total gain that is calculated by the total gain calculation circuit 54 is provided to the multiplier 53 and the comparator 48. The multiplier 53 multiplies the total gain and the output signal of the divider 51, and provides a decoder circuit 55 with the multiplication signal. The operation of the multiplier 53 includes correction of the total gain in a manner to offset the change of the maximum integration time MAX-EXP, and corresponds to the operations of the multipliers 43a to 43c and the second selection circuit 44 of the first embodiment. The decoder circuit 55 operates in the same manner as in the first embodiment.

In the exposure control circuit 35 of the above-described structure, the comparator 48 and the selection circuit 49 perform four operations (a) to (d), which are described below. Here, Ga1 and Ga2 are the first and second reference gain values, HYS is the hysteresis value, MAX-EXP is the maximum integration time, MSX-EXPS is the reference maximum integration time, and EADJ1 and EADJ2 are the first and second operation coefficients.

(a) Ga1+HYS is smaller than the total gain, and the selection circuit 49 selects and outputs MAX-EXPS*EADJ1 when the maximum integration time MAX-EXP of the preceding frame satisfies MAX-EXP=MAX-EXPS.

(b) Ga1−HYS is greater than the total gain, and the selection circuit 49 selects and outputs MAX-EXPS when the maximum integration time MAX-EXP of the preceding frame satisfies MAX-EXP=MAX-EXPS*EADJ1.

(c) Ga2+HYS is smaller than the total gain, and the selection circuit 49 selects and outputs MAX-EXPS*EADJ2 when the maximum integration time MAX-EXP of the preceding frame satisfies MAX-EXP=MAX-EXPS*EADJ1.

(d) Ga2−HYS is greater than the total gain, and the selection circuit 49 selects and outputs MAX-EXPS*EADJ1 when the maximum integration time MAX-EXP of the preceding frame satisfies MAX-EXP=MAX-EXPS*EADJ2.

Through such operations, the maximum integration time MAX-EXPS is switched in three steps based on the change of the total gain. Then, the first and second operation coefficients EADJ1 and EADJ2 are properly changed so that the three-step values of the maximum integration time are properly changed.

In addition to the advantages of the first embodiment, the second embodiment has the advantage that the values of the maximum integration time MAX-EXP switched in three steps are changed in an appropriate manner. Thus, the maximum integration time MAX-EXP, or the frame rate, is set in a flexible manner.

It should be apparent to those skilled in the art that the present invention may be embodied in many other specific forms without departing from the spirit or scope of the invention. Particularly, it should be understood that the present invention may be embodied in the following forms.

In the first and second embodiments, the maximum integration time may be switched in four or more steps.

The present examples and embodiments are to be considered as illustrative and not restrictive, and the invention is not to be limited to the details given herein, but may be modified within the scope and equivalence of the appended claims.

What is claimed is:

1. An automatic gain control circuit for outputting, based on comparison between a target brightness and an average brightness of brightness data output in units of frames from an image sensor, an integration time adjustment signal for adjusting an integration time during which the image sensor is exposed, a gain adjustment signal for adjusting a gain of an amplifier that amplifies an output signal of the image sensor, and a frame rate adjustment signal for changing a frame rate, the automatic gain control circuit comprising:

an exposure control circuit for adjusting a blanking time of each frame, and outputting, as the frame rate adjustment signal, a maximum integration time adjustment signal for switching a maximum integration time of the image sensor.

2. The automatic gain control circuit according to claim 1, wherein the exposure control circuit includes:

a total gain calculation circuit for calculating a total gain based on the average brightness and the target brightness;

a decoder circuit for generating the integration time adjustment signal and the gain adjustment signal based on the total gain and the maximum integration time;

a maximum integration time switch circuit for switching the maximum integration time based on comparison between the gain adjustment signal and a reference gain value to generate the maximum integration time adjustment signal; and a total gain correction circuit, connected between the total gain calculation circuit and the decoder circuit, for correcting the total gain to offset a change in the maximum integration time based on the maximum integration time adjustment signal from the maximum integration time switch circuit.

3. The automatic gain control circuit according to claim 2, wherein the maximum integration time switch circuit includes:

a sequence circuit for comparing the gain adjustment signal with a plurality of reference gain values to generate a first selection signal; and a first selection circuit for selecting one of a plurality of maximum integration times in accordance with the first selection signal.

4. The automatic gain control circuit according to claim 3, wherein the sequence circuit compares the gain adjustment signal with a value obtained by adding a hysteresis value to the reference gain value or a value obtained by subtracting the hysteresis value from the reference gain value.

5. The automatic gain control circuit according to claim 3, wherein the sequence circuit includes a reference gain value adjustment circuit for adjusting the reference gain value to offset relative change of the gain adjustment signal based when the maximum integration time is shortened.

6. The automatic gain control circuit according to claim 2, wherein the total gain correction circuit includes a multiplication circuit for multiplying the total gain calculated by the total gain calculation circuit by an inverse of a ratio of change in the maximum integration time.

7. The automatic gain control circuit according to claim 3, wherein the maximum integration time switch circuit multiplies a reference maximum integration time by a plurality of fixed operation coefficients to generate the plurality of maximum integration times.

8. The automatic gain control circuit according to claim 3, wherein the maximum integration time switch circuit multiplies a reference maximum integration time by a plurality of variable operation coefficients to generate the plurality of maximum integration times.

9. The automatic gain control circuit according to claim 2, wherein the decoder circuit generates the gain adjustment signal and the integration time adjustment signal based on the total gain within shortest exposure time range of the image sensor so that the gain of the amplifier is adjusted in a state in which the exposure time of the image sensor is fixed.

10. The automatic gain control circuit according to claim 9, wherein the total gain calculation circuit calculates a total gain to decimal places in the shortest exposure time range of the image sensor, and the decoder circuit changes the gain adjustment signal when the total gain is changed by decimals.

11. An automatic gain control circuit for receiving brightness data output in units of frames from an image sensor, adjusting an integration time during which the image sensor is exposed, and adjusting gain of an amplifier that amplifies an output signal of the image sensor, the automatic gain control circuit comprising:

a total gain calculation circuit for calculating a total gain based on an average brightness and a target brightness;

a decoder circuit for generating, based on the total gain and a maximum integration time adjustment signal, an integration time adjustment signal for adjusting the integration time and a gain adjustment signal for adjusting the gain of the amplifier;

a maximum integration time switch circuit for generating the maximum integration time adjustment signal to switch a maximum integration time based on comparison between the gain adjustment signal and a reference gain value, and generating a selection signal relating to the switching of the maximum integration time; and a total gain correction circuit, connected between the total gain calculation circuit and the decoder circuit, for correcting the total gain to offset change in the maximum integration time based on the selection signal from the maximum integration time switch circuit.

12. An automatic gain control circuit for receiving brightness data output in units of frames from an image sensor, adjusting an integration time during which the image sensor is exposed, and adjusting gain of an amplifier that amplifies an output signal of the image sensor, the automatic gain control circuit comprising:

a total gain calculation circuit for calculating a total gain based on an average brightness and a target brightness;

a decoder circuit for generating, based on the total gain and a maximum integration time adjustment signal, an integration time adjustment signal for adjusting the integration time and a gain adjustment signal for adjusting the gain of the amplifier;

a maximum integration time switch circuit for generating the maximum integration time adjustment signal to switch a maximum integration time based on comparison between the gain adjustment signal and a reference gain value and for generating a rate signal showing change in the maximum integration time; and a total gain correction circuit, connected between the total gain calculation circuit and the decoder circuit, for correcting the total gain to offset change in the maximum integration time based on the rate signal from the maximum integration time switch circuit.

13. An automatic gain control circuit for changing gain of an amplifier that amplifies an output signal of an image sensor and a frame rate based on brightness information detected by the image sensor in units of frames, the image sensor including a plurality of photoelectric conversion elements, and each of the frames including an active period for reading signals from the plurality of photoelectric conversion elements and a blanking period other than the active period, the automatic gain control circuit comprising:

a gain change circuit for fixing the active period and adjusting the blanking period in each of the frames to change the frame rate, and instructing, when the frame rate is changed, change in the gain of the amplifier in correspondence with a substantial inverse of a ratio of the change of the frame rate.

14. A semiconductor device comprising:

an automatic gain control circuit for outputting, based on comparison between a target brightness and an average brightness of brightness data output in units of frames from an image sensor, an integration time adjustment signal for adjusting an integration time during which the image sensor is exposed, a gain adjustment signal for adjusting a gain of an amplifier that amplifies an output signal of the image sensor, and a frame rate adjustment signal for changing a frame rate, the automatic gain control circuit including:

an exposure control circuit for adjusting a blanking time of each frame, and outputting, as the frame rate adjustment signal, a maximum integration time adjustment signal for switching a maximum integration time of the image sensor.

* * * * *